(12) United States Patent
Derom

(10) Patent No.: US 11,592,131 B2
(45) Date of Patent: Feb. 28, 2023

(54) FLUID CONNECTING DEVICE, IN PARTICULAR FOR THE VENTILATION OF A TRANSMISSION CASING

(71) Applicant: AKWEL, Champfromier (FR)

(72) Inventor: Quentin Derom, Avignon (FR)

(73) Assignee: AKWEL, Champfromier (FR)

( * ) Notice: Subject to any disclaimer, the term of this patent is extended or adjusted under 35 U.S.C. 154(b) by 50 days.

(21) Appl. No.: 17/072,769

(22) Filed: Oct. 16, 2020

(65) Prior Publication Data

US 2021/0116061 A1 Apr. 22, 2021

(30) Foreign Application Priority Data

Oct. 17, 2019 (FR) ...................................... 19/11604

(51) Int. Cl.
| | | |
|---|---|---|
| *F16L 37/086* | (2006.01) | |
| *F16L 37/098* | (2006.01) | |
| *F16L 37/133* | (2006.01) | |
| *F16H 57/04* | (2010.01) | |

(52) U.S. Cl.
CPC ........... *F16L 37/086* (2013.01); *F16L 37/098* (2013.01); *F16L 37/133* (2013.01); *F16H 57/0416* (2013.01)

(58) Field of Classification Search
CPC .... F16L 37/098; F16L 37/0985; F16L 37/133
See application file for complete search history.

(56) References Cited

U.S. PATENT DOCUMENTS

| | | | |
|---|---|---|---|
| 4,275,907 A * | 6/1981 | Hunt | ..................... F16L 37/133 |
| | | | 285/330 |
| 5,346,264 A | 9/1994 | Law et al. | |
| 6,294,740 B1 | 9/2001 | Van Swearingen | |
| 9,322,499 B2 | 4/2016 | Guest | |
| 2019/0186615 A1 | 6/2019 | Shirotori | |

FOREIGN PATENT DOCUMENTS

| | | | | |
|---|---|---|---|---|
| EP | 1113553 A1 | 7/2001 | | |
| EP | 1600682 A2 * | 11/2005 | ............ | F16L 37/098 |
| WO | WO-2005024284 A1 * | 3/2005 | ............ | F16L 37/098 |
| WO | WO-2016013422 A1 * | 1/2016 | ............ | F16L 37/098 |
| WO | 2019/141968 A1 | 7/2019 | | |

* cited by examiner

*Primary Examiner* — Zachary T Dragicevich
(74) *Attorney, Agent, or Firm* — Oliff PLC

(57) ABSTRACT

A end-piece having a hollow tubular body having a longitudinal main axis X and provided with a plurality of longitudinal slots extending from an open end of the end-piece and delimiting a plurality of snap-fitting tabs, each provided with a snap-fitting leg delimited axially by a radial shoulder and extending axially by a guide ridge towards said free end, the guide ridge having a top corresponding to a maximum snap-fitting force linked to the crossing of said top. At least first and second tabs defining respectively first and second tops, the tops are axially shifted relative to each other.

10 Claims, 7 Drawing Sheets

[Fig. 1]
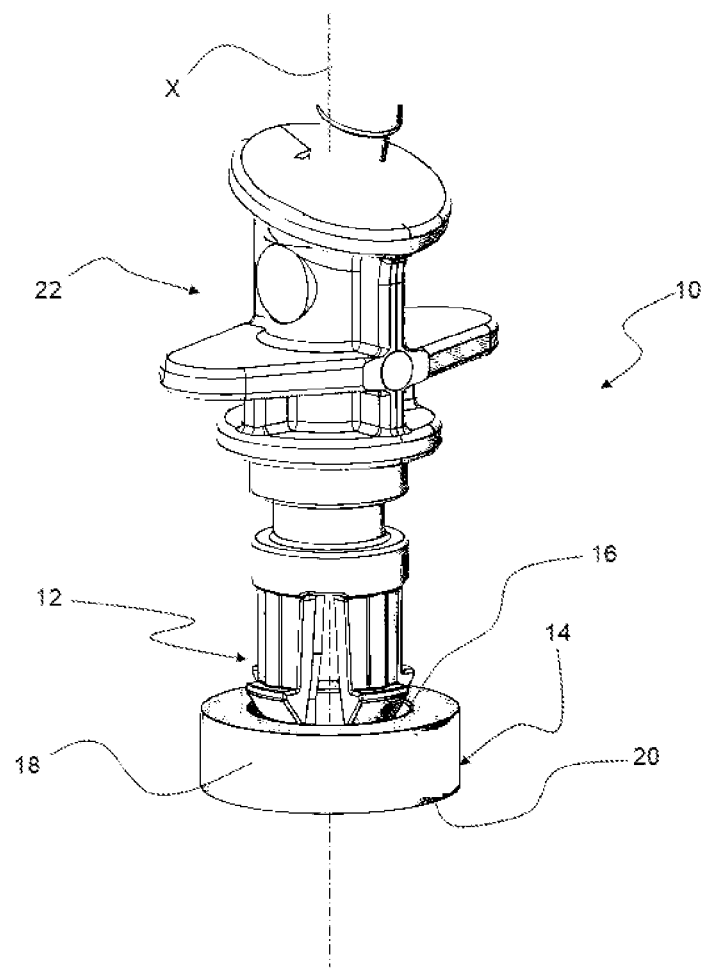

[Fig. 2]
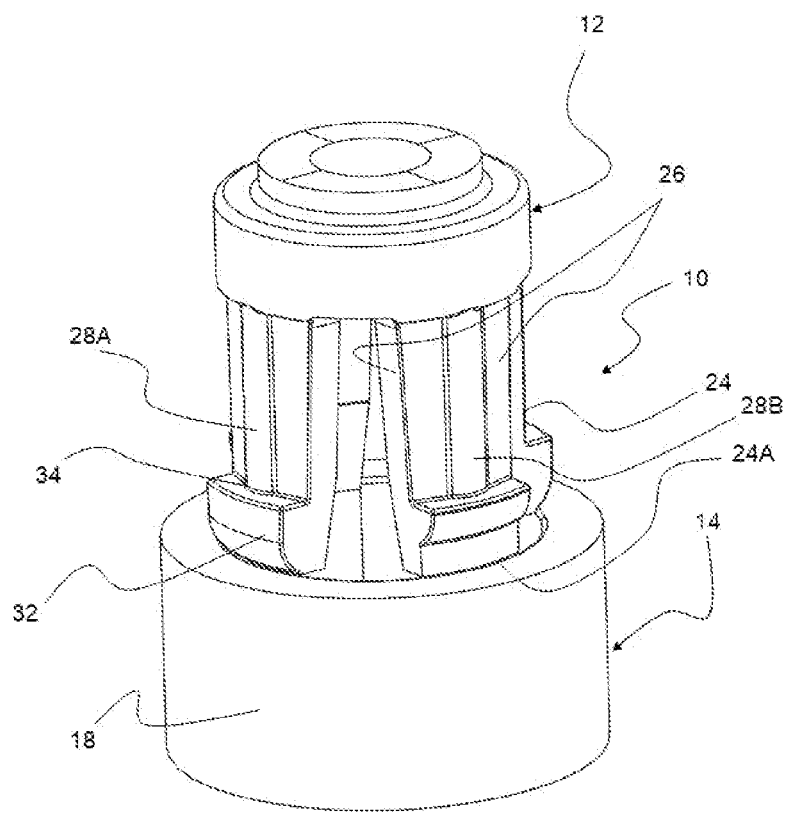

[Fig. 3]
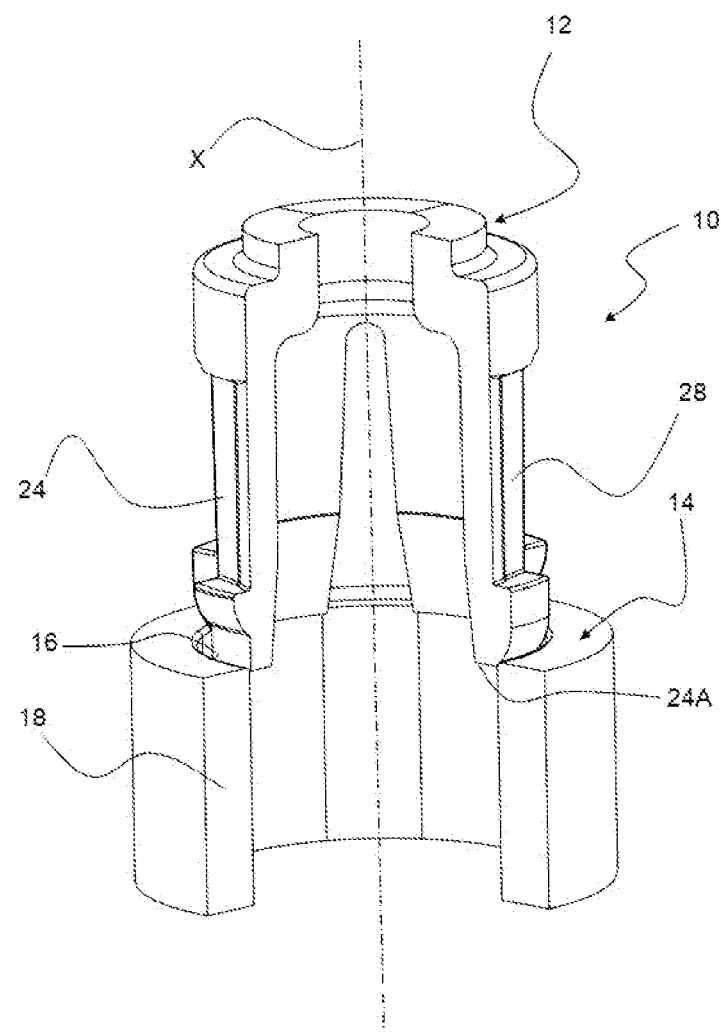

[Fig. 4]
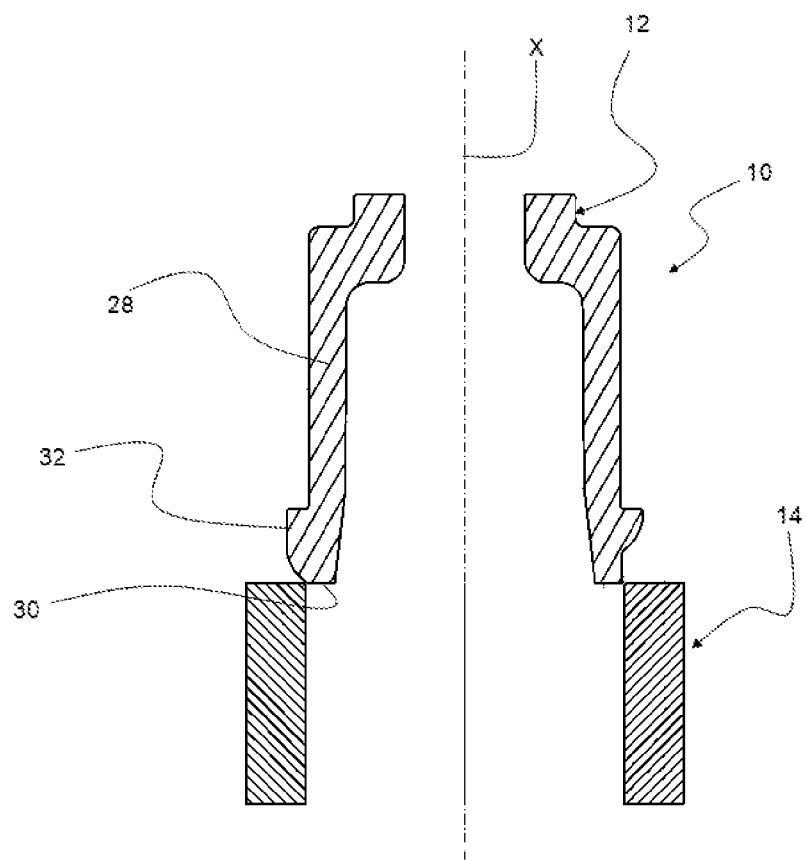

[Fig. 5]
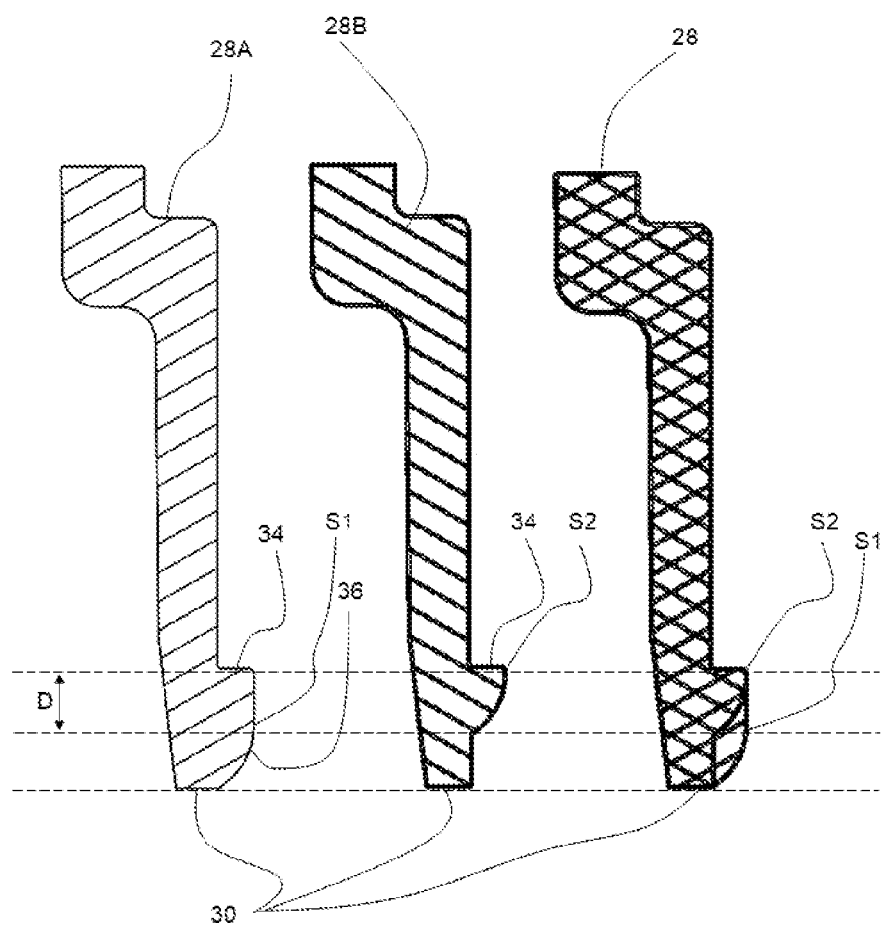

[Fig. 6]
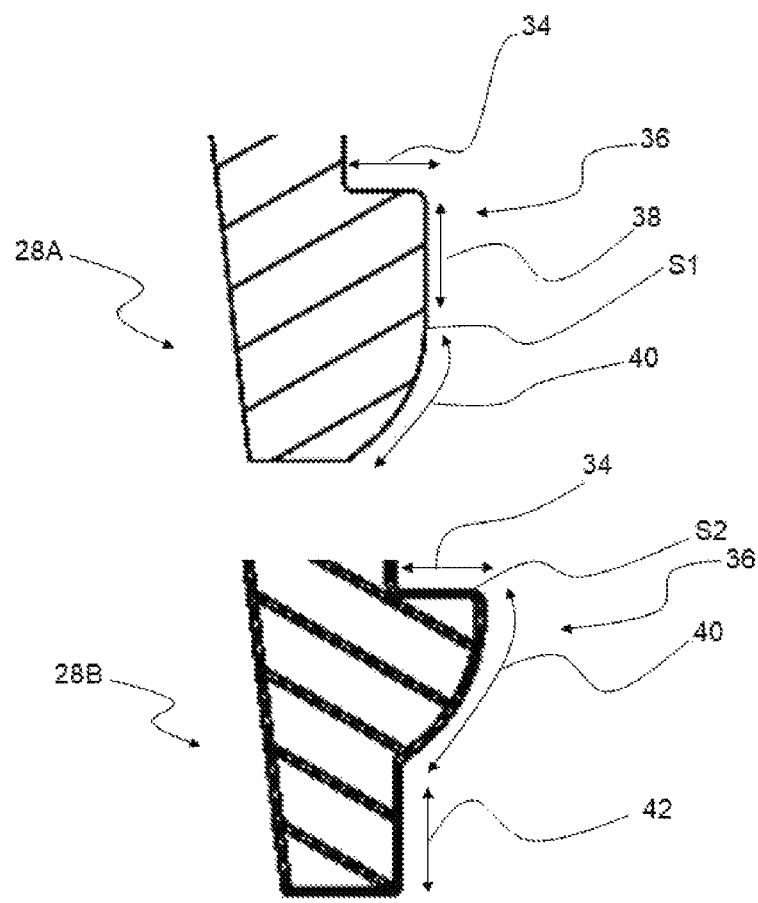

[Fig. 7]
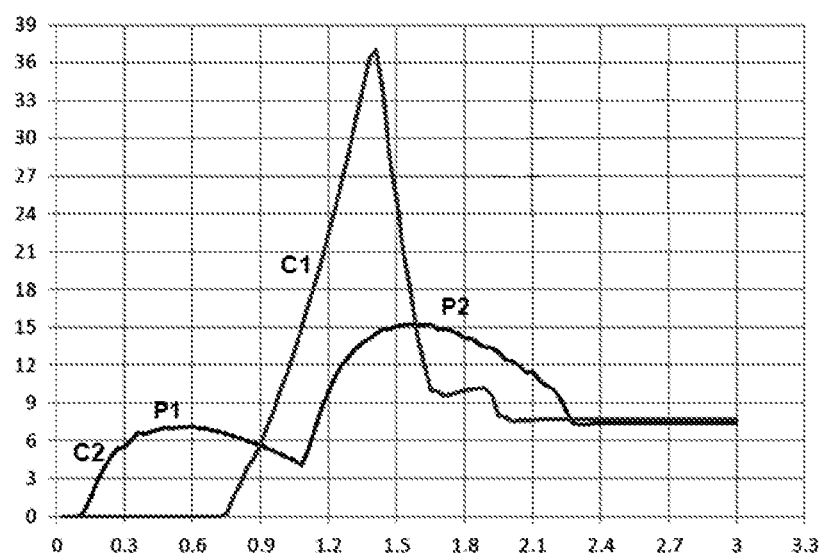

FLUID CONNECTING DEVICE, IN PARTICULAR FOR THE VENTILATION OF A TRANSMISSION CASING

TECHNICAL FIELD

The present invention concerns a fluid connecting device by snap-fitting an end-piece on an outer member. The invention applies more specifically but not exclusively to the connection of an end-piece of a ventilation member in a transmission casing of a motor vehicle.

Generally, the transmission casing is in the form of a housing, for example made of metal material. More particularly, the housing may further have at least one opening for the ventilation of the transmission, generally provided on the top of the housing and which communicates with the interior thereof. The ventilation member, also known by the term «breather» can for example include a pipe for venting the inside of the transmission which opens outside in a place which is in principle protected with regard to the penetration of impurities.

Thus, during the operation of the transmission, the oil contained therein heats up and the formed vapors escape to the outside thanks to the ventilation unit.

PRIOR ART

The ventilation unit may include a fastening end-piece inside the orifice of the casing housing. It is thus known from the prior art, in particular from the document US20190186615A1, a ventilation member comprising an end-piece for fastening the member on a ventilation opening of the casing housing. The fastening end-piece comprises a body of a generally tubular shape having a plurality of cutouts delimiting tabs provided, at the end thereof, with a retaining protrusion.

When press-fitting the nozzle into the ventilation opening, the force to be produced is relatively significant due to the presence of a plurality of snap-fitting tabs. This press-fitting can then be difficult to operate and it is sometimes necessary to force the insertion of the end-piece at the risk of plastically and irreversibly deforming the snap-fitting tabs or the end-piece itself.

There is therefore a need for a snap-fitting end-piece whose press-fitting into an outer member provided for this purpose would be facilitated while ensuring a solid and reliable fastening to this outer member.

SUMMARY OF THE INVENTION

To this end, the invention relates to an end-piece to be snap-fit connected by to an outer member, comprising a hollow tubular body having a longitudinal main axis X and provided with a plurality of longitudinal slots extending from an open end of the end-piece and delimiting a plurality of snap-fitting tabs, each tab including a free end provided with a snap-fitting leg delimited axially by a radial snap-fitting shoulder and extending axially by a guide ridge towards said free end, the guide ridge having a top corresponding to a maximum snap-fitting force linked to the crossing of said top, characterized in that the radial shoulders extend in the same radial plane defined relative to the main axis X and in that, at least first and second tabs defining respectively first and second tops, the tops are axially shifted relative to each other along the main axis X such that the value of the intensity of the instantaneous cumulative snap-fitting force of the two tabs in the outer member always remains less than the sum of the maximum snap-fitting force values of each of the tabs.

Thanks to the invention, the total force for fastening the end-piece in the outer member is advantageously reduced, which allows limiting the stresses exerted on the end-piece itself during the snap-fitting operation. Indeed, the axial shift of the tops of snap-fitting force intensity allows facilitating the simultaneous press-fitting of the tabs, for example in an opening provided for this purpose in the outer member. The distribution of the snap-fitting forces of all tabs in the axial direction allows facilitating the fastening of the snap-fitting end-piece on the outer member by snap-fitting.

An end-piece according to the invention may further have one or more of the following features.

In another embodiment of the invention, the guide ridge comprises a substantially rectilinear axial portion and a ramp portion joined to define the top, the rectilinear portion of each of the first and second tabs being of different axial length.

In another embodiment of the invention, the ramp portion of each of the tabs has a curvilinear or rounded profile.

In another embodiment of the invention, the ramp portion forms an arc of a circle and/or has a rectilinear bevel shape.

In another embodiment of the invention, at least one of the first and second tabs has a rectilinear portion of zero axial length and the ramp portion joins the radial shoulder to define the top.

In another embodiment of the invention, the snap-fitting leg is formed remote from the free end edge and the guide ridge is spaced from said edge by a thinned engagement portion relative to the snap-fitting leg. In other words, the snap-fitting tab has a narrowing of the radial section thereof from the snap-fitting leg to the engagement portion. Consequently, this thinned engagement portion is configured to produce substantially no force for engaging the end-piece with the outer member.

In another embodiment of the invention, an end-piece comprises a pair of first tabs defining first tops and a pair of second tabs defining second tops, the tabs of each of the pairs are located facing each other.

In another embodiment of the invention, the snap-fitting tabs each have the same snap-fitting profile which protrudes radially outwardly or inwardly from each tab.

In another embodiment of the invention, the end-piece, comprising a substantially annular body, the distribution of the tabs is regular around the circumference of the body.

The invention also concerns a connecting device comprising an end-piece according to the invention and an outer member configured to receive the end-piece by snap-fitting, characterized in that the outer member comprises an annular flange with which the end-piece cooperates by internal or external snap-fitting.

Preferably, the outer member comprises an annular opening delimited by a neck having an annular flange. The snap-fitting end-piece is then inserted into the annular opening to cooperate with the annular flange.

BRIEF DESCRIPTION OF THE DRAWINGS

Other features and advantages of the invention will appear in light of the following description, made with reference to the appended drawings in which:

FIG. 1 represents a perspective view of a connecting device according to the invention comprising a snap-fitting end-piece and an outer member;

FIG. 2 represents a perspective view of the end-piece and the outer member of FIG. 1 before snap-fitting;

FIG. 3 represents a broken and perspective view of the device represented in FIG. 2;

FIG. 4 represents a sectional view of the device of FIG. 2 along a plane passing through the axis X;

FIG. 5 represents a sectional view of two snap-fitting tabs of the snap-fitting end of FIG. 2 and a third tab schematically illustrating the superposition of the two snap-fitting tabs;

FIG. 6 represents a perspective view on an enlarged scale of two snap-fitting legs of the snap-fitting tabs of the end-piece of FIG. 2;

FIG. 7 is a graph illustrating the evolution of the intensity of a snap-fitting force of the end-piece in a first configuration C1 corresponding to the prior art and in a second configuration C2 in accordance with the invention.

DESCRIPTION OF THE EMBODIMENTS

A fluid connecting device is represented in FIG. 1 according to the invention. This device bears the general reference 10. The connecting device 10 comprises a snap-fitting end-piece 12 configured to be connected to an outer member 14 by snap-fitting. In the described example, the outer member 14 comprises an annular opening 16 delimited by an annular peripheral wall 18 about an axis X-X and by an annular flange 20 extending in the radial direction. The end-piece 12 is, in this example, intended to be press-fitted inside the opening 16 to be snap-fitted on the annular flange 20.

In the example described in FIG. 1, the outer member 14 forms a portion of a transmission casing housing of a motor vehicle (not represented) comprising a neck delimited by the annular wall 18 and opening onto the annular opening 16, the annular wall 18 as well as the annular flange 20 extending inside the casing housing. The casing housing is generally made of a metal material. In order to simplify the figures, the outer member 14 is represented schematically by an annulus or a ring.

In the described example, the end-piece 12 forms an end portion of a ventilation member 22 of the transmission (FIG. 1). Such a ventilation member 22 has the function of venting the housing of the transmission casing and comprises an air vent commonly referred to as a breather (not visible in the figures). The end-piece 12 is preferably made of a plastic material such as for example a silicone material or a thermoplastic elastomer (TPE) material.

As illustrated in FIGS. 2 to 4, the end-piece 12 comprises a body 24 of a generally hollow tubular shape about a main longitudinal axis X. The body 24 preferably has a generally annular shape about the axis X.

The end-piece 12 further has an open free end 24A. In accordance with the invention, the end-piece 12 is provided with a plurality of longitudinal slots 26 extending from an open end 24A of the end-piece 12 and delimiting a plurality of snap-fitting tabs 28.

As illustrated in FIG. 6, each snap-fitting tab 28 includes a free end 30 provided with a snap-fitting leg 32 delimited axially by a radial shoulder 34 and extending axially by a guide ridge 36 in the direction of the free end 30.

The radial shoulder 34 forms in the example a flange for hooking with the outer member 14 and in this particular example, with the inner annular retaining flange 20. Thus, in the embodiment which is illustrated in the Figures, the snap-fitting tab 28 comprises a recess which delimits the shoulder 34 extending radially from an outer surface of the tab 28. The shoulder 34 extends, in this example, in a plane substantially orthogonal to the axis X-X. The snap-fitting end-piece 12 is then configured to be inserted into the opening 16 along the axis X-X until the snap-fitting leg 32 engages with the annular retaining flange 20 via the shoulder 34. In this position, the upper face of the radial shoulder 34 which is rotated in a direction opposite to the end 30 is in contact with an inner face of the retaining flange 20. Moreover, according to the invention, the radial shoulders 34 extend in the same radial plane orthogonal to the main axis X.

The guide ridge 36, in this example, has the function of facilitating the insertion by progressive deformation of the snap-fitting tab 28 radially inwardly. Thus, the snap-fitting tab 28 may slightly deviate from its rest configuration by radial progressive deflection guided by the contact of the guide ridge 36 against the inner face of the wall 18 of the opening 16. This deformation causes the progressive deflection of the snap-fitting tab 28 until then, by elastic return, being snap-fitted under the annular flange 20 of the neck formed by the annular wall 18 of the opening 16.

The guide ridge 36 has in particular a top S corresponding to a maximum snap-fitting force linked to the crossing of said top S. In the described example, the top S corresponds to a thickened portion of the snap-fitting leg 32. The top S is defined at the top of the guide ridge 36. In the embodiment illustrated in the Figures, the top S is defined as being the point of the snap-fitting profile radially farthest from the axis X.

Preferably, as illustrated, the guide ridge 36 of each of the tabs 28 comprises a substantially rectilinear portion 38 starting from the shoulder 34 and a ramp portion 40 joining the portion 38 to define the top S. This rectilinear portion 38 extends, in the example, parallel to the axis X.

In the described example, at least first 28A and second 28B tabs define respectively first S1 and second S2 tops, the tops S1 and S2 are axially shifted relative to each other. Thanks to this axial shift «D» of the tops S1 and S2, the value of the instantaneous cumulative snap-fitting force of the two tabs 28A, 28B in the outer member 14 always remains less than the sum of the maximum value of the snap-fitting force which is associated to each of the legs 28A, 28B taken individually.

For example, in order to carry out this axial shift «D» of the tops S1 and S2, the rectilinear portion 38, separating the radial shoulder 34 from the ramp portion 40, is of different axial length between the first 28A and second 28B tabs.

It can be even seen that in FIG. 2, at least one of the first 28A and second 28B tabs, herein the second tab 28B, has a rectilinear portion 38 of zero axial length. Consequently, the ramp portion 40 starts directly from the radial shoulder 34.

Preferably, the ramp portion 40 of each of the tabs has a curvilinear profile, for example, of a rounded shape, for example in the form of an arc of a circle. In a variant which is not illustrated, the ramp portion 40 has a rectilinear shape with a straight edge but beveled. Possibly, in another variant which is not illustrated, the ramp portion 40 may also comprise a combination of an arc of a circle and a rectilinear beveled shape.

Preferably, the guide ridge 36 of at least one tab 28, herein the tab 28B, is spaced from the free end edge 30 of said snap-fitting tab 28 by a thinned engagement portion 42 extending axially between the guide ridge 36 and the edge of the free end 30. Preferably, this thinned portion 42 is configured to produce a substantially zero engagement force intensity value of the portion 42 with the outer member 14.

In the embodiment illustrated in the Figures, the end-piece 12 comprises a plurality of snap-fitting tabs 28 distributed in pairs of identical tabs. For example, the end-piece 12 comprises a pair of first tabs 28A defining first tops S1 and a pair of second tabs 28B defining second tops S2, the tabs of each of the pairs being disposed facing each other. Preferably, the end-piece 12 comprises a substantially annular body 24 in which the distribution of the tabs 28 is regular around its circumference.

In a variant of the invention which is not illustrated in the Figures, the snap-fitting tabs 28 may have a snap-fitting profile which protrudes radially inwardly to form a snap-fitting leg 32 facing the inside of the end-piece 12 then initiating an external cooperation of the end-piece with the outer member 14 and not as in the Figures turned outwardly, then initiating an internal cooperation of the end-piece 12 with the outer member 14. The top S is then defined, in this variant, as being the point of the snap-fitting profile radially closest to the axis X.

A graph is shown in FIG. 7, representing the evolution of the value of the intensity in Newton of the force for inserting the end-piece 12 inside the annular opening 16 of the outer member 14 as a function of the axial insertion depth in millimeters. The graph comprises two curves C1 and C2.

Curve C1 corresponds to the evolution of the value of intensity of the total insertion force as a function of the axial insertion depth when the end-piece 12 comprises a plurality of identical snap-fitting tabs 28. For example, the end-piece 12 includes four snap-fitting tabs 28 all having the same snap-fitting profile of the snap-fitting tab 28B which is illustrated in FIG. 5.

On this curve C1 initially, the intensity of the insertion force is zero and corresponds to the contact of the substantially rectilinear portion of small thickness 42 located between the free end 30 and the snap-fitting leg 32. Then, the ramp portion 40 of the guide ridge 36 comes into contact with the inner surface of the annular wall 18 of the outer member 14 causing the inwardly progressive deflection of the snap-fitting tabs 28. This creates an insertion force and a deflection of the snap-fitting tabs 28. This cumulative insertion force for the four snap-fitting tabs 28 has an intensity value which increases until reaching a maximum upon the simultaneous deflection of the four tops S2. A peak of insertion force intensity is then observed at 14 millimeters of insertion depth. Once the peaks have been crossed, the intensity value of the force is stabilized at a value of 9 millimeters.

The curve C2 corresponds to the evolution of the value of intensity of the total insertion force as a function of the insertion depth when the end-piece 12 comprises a plurality of identical tabs 28 two by two in pairs, in accordance with the invention. For example, the end-piece 12 comprises a pair of snap-fitting tabs 28A and a pair of snap-fitting tabs 28B, the tabs 28 of each of the pairs extending facing each other.

On the curve C2, two portions of curve P1 and P2 are distinguished. The portion P1 has a bump shape and corresponds to the crossing of the tops S1 of the pair of snap-fitting tabs 28A. Indeed, the snap-fitting lug of these tabs 28A comprises a guide ridge 36 which starts from the free end 30 of the tab without an axial shift. The portion P2 also has a bump shape and corresponds to the crossing of the tops S2 which are axially shifted relative to the tops S1 by an axial shift «D».

Thanks to the axial shift D of the tops S1 and S2, the value of intensity of the insertion force remains less than 15 Newtons while without axial shift of the tops, according to the prior art and in this described example, the value of the intensity can reach a peak value of more than 36 Newtons.

The curve C2 of the graph clearly shows the almost homogeneous distribution of the total value of the insertion force in the axial direction, unlike the curve C1 which demonstrates an isolated force peak.

Of course, the invention is not limited to the previously described embodiments. Other embodiments which are within the reach of those skilled in the art can also be considered without departing from the scope of the invention defined by the claims below.

The invention claimed is:

1. An end-piece to be snap-fit connected by to an outer member, comprising:
 a hollow tubular body having a longitudinal main axis X and provided with:
 a plurality of longitudinal slots extending from an open end of the end-piece, and
 a plurality of snap-fitting tabs delimited by the plurality of longitudinal slots, each snap-fitting tab including a free end provided with a snap-fitting leg delimited axially by a radial snap-fitting shoulder and extending axially by a guide ridge towards the free end, the guide ridge having a top corresponding to a maximum snap-fitting force,
 wherein the radial shoulders extend in a same radial plane relative to the main axis X, the plurality of snap fitting tabs comprising at least one first tab and at least one second tab having respectively a first top and a second top, the first top and the second top being axially shifted relative to each other along the main axis X such that the value of the intensity of the instantaneous cumulative snap-fitting force of the first tab and the second tab in the outer member always remains less than the sum of the maximum snap-fitting force values of each of the first tab and the second tab.

2. The end-piece according to claim 1, wherein the guide ridge comprises a substantially rectilinear axial portion and a ramp portion joined at the top, a rectilinear axial portion of the first tab and a rectilinear axial portion of the second tab being of different axial length.

3. The end-piece according to claim 2, wherein the ramp portion of each of the tabs has a curvilinear or rounded profile.

4. The end-piece according to claim 3, wherein the ramp portion forms an arc of a circle.

5. The end-piece according to claim 2, wherein at least one of the first tab and the second tab is deprived of the rectilinear portion and the ramp portion joins the radial shoulder at the top.

6. The end-piece according to claim 1, wherein the snap-fitting leg is formed remote from the free end edge and the guide ridge is spaced from the edge by a thinned engagement portion relative to the snap-fitting leg.

7. The end-piece according to claim 1, wherein the plurality of snap fitting tabs comprises at least one pair of first tabs and at least one pair of second tabs, the tabs of each of the pairs extend facing each other.

8. The end-piece according claim 1, wherein the snap-fitting tabs each have the same snap-fitting profile which protrudes radially outwardly or inwardly from each tab.

9. The end-piece according to claim 1, comprising a substantially annular body, the distribution of the tabs is regular around the circumference of the body.

10. A connecting device comprising an end-piece according to claim 1 and an outer member configured to receive the end-piece by snap-fitting, wherein the outer member comprises an annular flange with which the end-piece cooperates by internal or external snap-fitting.

* * * * *